United States Patent
Ogasawara et al.

(10) Patent No.: US 6,576,368 B1
(45) Date of Patent: Jun. 10, 2003

(54) POSITIVE ACTIVE MATERIAL FOR USE IN SEALED ALKALINE STORAGE BATTERIES

(75) Inventors: Takeshi Ogasawara, Hirakata (JP); Nobuyuki Higashiyama, Mino (JP); Mutsumi Yano, Hirakata (JP); Mamoru Kimoto, Hirakata (JP); Yasuhiko Itoh, Yawata (JP); Koji Nishio, Hirakata (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 0 days.

(21) Appl. No.: 09/410,298

(22) Filed: Sep. 30, 1999

(30) Foreign Application Priority Data

Oct. 2, 1998 (JP) ............................. 10-281081

(51) Int. Cl.$^7$ ................................ H01M 4/32
(52) U.S. Cl. ...................... 429/223; 29/623.1
(58) Field of Search ......................... 429/223

(56) References Cited

U.S. PATENT DOCUMENTS 5,466,543 A * 11/1995 Ikoma ........................ 429/59
5,523,182 A * 6/1996 Ovshinsky .................. 429/223
6,114,063 A * 9/2000 Katsumoto .................. 429/223
6,120,937 A * 9/2000 Kojima ....................... 429/223

FOREIGN PATENT DOCUMENTS

| EP | 0817291 | 1/1998 |
| EP | 0853346 | 7/1998 |
| EP | 0867959 | 9/1998 |
| JP | 61-49374 | 9/1985 |
| JP | 61-138458 | 6/1986 |
| JP | 2765008 | 9/1990 |
| JP | 8-24041 | 1/1992 |
| JP | 05028992 | 2/1993 |
| JP | 08-227711 | 9/1996 |
| JP | 10-74512 | 3/1998 |

* cited by examiner

*Primary Examiner*—Patrick Ryan
*Assistant Examiner*—Mark Ruthkosky
(74) *Attorney, Agent, or Firm*—W. F. Fasse; W. G. Fasse

(57) ABSTRACT

A positive active material for sealed alkaline storage batteries is obtainable by subjecting β-nickel hydroxide, together with at least one additive selected from yttrium, gadolinium, erbium and ytterbium, and oxides, hydroxides, fluorides and chlorides thereof, to an oxidation treatment with an oxidizing agent in an aqueous alkaline solution. The positive active material contains nickel with a valence number in a range from 2.1 to 3.4.

18 Claims, No Drawings

POSITIVE ACTIVE MATERIAL FOR USE IN SEALED ALKALINE STORAGE BATTERIES

BACKGROUND OF THE INVENTION

1. Field of the Invention

The present invention relates to positive active material for use in sealed alkaline storage batteries, more particularly to the active material of a positive electrode which, when incorporated in alkaline storage batteries, can provide thereto a high discharge capacity that is sustained over a long period of successive charge-discharge cycles.

2. Related Art

The use of sintered-nickel electrode for a positive electrode as of a nickel-metal hydride or nickel-cadmium storage battery has been conventionally known in the art. Such a sintered-nickel electrode contains active material (nickel hydroxide) loaded in a sintered substrate made by sintering nickel powder into a perforated steel plate or the like.

In the fabrication of sintered-nickel electrodes, if a high loading of active material is to be sought, a highly-porous sintered substrate must be used. However, the increased porosity of sintered substrate leads to the increased tendency for the nickel active material to fall off, since sintering is only effective to provide weak bonds between nickel powders. It is accordingly difficult in practice to increase its porosity to 80% or higher. This has restrained the sintered-nickel electrode from enjoying high loading of nickel active material. Also, the sintered substance has small pore sizes generally of not exceeding 10 $\mu$m. This has required. that a complex impregnation process be repeated several times in loading the sintered substrate with nickel active material.

In view of the above, a nonsintered-nickel electrode has been recently proposed and put to practical use. The nonsintered-nickel electrode can be fabricated by applying a paste consisting of a mixture of nickel hydroxide active material and a binder, such as an aqueous solution of methyl cellulose, to a highly-porous conductive core so that the core is loaded with the active material. The high porosity of the conductive core, 95% or higher, not only enables high loading of active material, but also facilitates loading of active material into the conductive core.

However, in the fabrication of nonsintered-nickel electrodes, the use of conductive core having an increased porosity in pursuit of increased loading of active material reduces its ability to collect current, leading to the reduced utilization factor of active material.

In order to increase the active material utilization factor of nonsintered-nickel electrodes, the addition of cobalt hydroxide to nickel hydroxide to provide a mixed positive active material has been proposed (Japanese Patent Publication No. 61-49374 (1986)).

Other proposals include adding cobalt monoxide to nickel hydroxide (Japanese Patent Laying-Open No. 61-138458 (1986)) and adding powders of cobalt hydroxide and yttrium compound to nickel hydroxide powder (Japanese Patent Laying-Open No. 5-28992 (1993)).

While these techniques are effective in improving the utilization factor of positive active material, such nonsintered-nickel positive electrodes, when incorporated into a cell or battery, increase a discharge reserve of a negative electrode thereof to result in the failure to obtain a sufficient battery capacity.

For sealed nickel-hydrogen and nickel-cadmium storage batteries, a negative electrode is designed to have excess capacity compared to a positive electrode capacity so that the negative electrode has a portion left uncharged even after the positive electrode has been fully charged. Accordingly, the positive electrode begins to evolve an oxygen gas at a final stage of charge. A sealing condition is maintained by the action of the negative electrode that absorbs the oxygen gas evolving from the positive electrode.

The oxygen-absorbing reaction of the nickel-cadmium storage battery during overcharge can be illustrated as follows:

Negative electrode $2OH^- \rightarrow 1/2O_2 + H_2O + 2e^-$

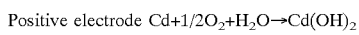

Positive electrode $Cd + 1/2O_2 + H_2O \rightarrow Cd(OH)_2$

In this reserve balance at the negative electrode, a discharge reserve is produced when divalent cobalt compounds primarily contained in the positive electrode, i.e. CoO and Co(OH)$_2$, metallic cobalt and a part of nickel hydroxide that undergoes an irreversible reaction (corresponding to discharge from 2.1~2.3 valence to 2.0 valence) are oxidized to their trivalent forms.

The quantity of electricity involved in such oxidation reactions is accumulated in the negative electrode to define the quantity of discharge reserve.

The discharge reserve, while may appear that it is not involved in the charge and discharge reactions, functions virtually to suppress a voltage drop at the negative electrode during the final stage of discharge and during the high-rate discharge so that the positive electrode capacity can be discharged to the final end. The discharge reserve is therefore an essential factor when designing a cell or battery.

However, the quantity of discharge reserve produced does not coincide with but mostly exceeds the necessary quantity, since it is produced secondarily as stated above. Accordingly, if the capacity is to be increased for the nickel-hydrogen and nickel-cadmium storage batteries, the discharge reserve must be reduced in quantity. From this point of view, a technique is disclosed, for example, in Japanese Patent Publication No. 8-24041 (1996), which subjects a mixture of nickel hydroxide and cobalt monoxide to an oxidation treatment with potassium peroxodisulfate, as an oxidizing agent, in an aqueous solution of potassium hydroxide so that only cobalt monoxide is converted to the form of β-CoOOH for use as active material. Also, the use of nickel oxyhydroxide covered with cobalt oxyhydroxide, as well as the use of solid solution particles consisting primarily of nickel oxyhydroxide, respectively for active materials, have been proposed, for example, in Japanese Patent Laying-Open No. 10-74512 (1998).

It has been found from the investigations conducted by the present inventors that the use of such techniques, while certainly possible to reduce the discharge reserve, lowers the charge acceptance of a battery or cell as a result of the oxidation treatment to result in the failure to obtain a sufficient level of discharge capacity.

SUMMARY OF THE INVENTION

The present invention is directed toward solving the above-described problems, and its object is to provide positive active material which can improve charge acceptance of a positive electrode to result in the constitution of a sealed alkaline storage battery having a high discharge capacity.

The active material of the present invention is the positive active material for use in sealed alkaline storage batteries, which is obtainable by subjecting β-nickel hydroxide, together with an additive, to an oxidation treatment with an oxidizing agent in an aqueous alkaline solution. The additive comprises at least one type selected from yttrium, gadolinium, erbium and ytterbium, and oxides, hydroxides, fluorides and chlorides thereof.

Subjecting the β-nickel hydroxide, together with the additive, to an oxidation treatment in an aqueous alkaline solution, according to the present invention, results in the provision of a positive active material which, when incorporated into a battery, cannot only reduce the discharge reserve but also increase the oxygen overvoltage during charge to improve charge acceptance, leading to a high discharge capacity of the battery. Although an exact reason why such results can be obtained is not clear, the effectiveness of the positive active material is believed to result from the oxidation treatment that causes metallic ions contained in the additive to diffuse into the crystal structure of nickel hydroxide.

In the present invention, the β-nickel hydroxide, prior to being subjected to an oxidation treatment, is preferably covered or mixed with at least one type selected from cobalt hydroxide, cobalt monoxide and a sodium-containing cobalt compound. When mixed with the nickel hydroxide, these cobalt compounds are provided preferably in the form of particles having sizes smaller than that of the nickel hydroxide. Since these compounds act as conducting agents, their presence on nickel hydroxide surfaces serves to increase the utilization factor of active material, thereby facilitating discharging thereof. The amount of cobalt compound used to cover or form a mixture with β-nickel hydroxide is preferably in the range of 1–10% by weight, as reduced to the amount of cobalt atoms, with respect to the amount of β-nickel hydroxide. If the amount falls below 1% by weight, the cobalt content of the active material may become too small to result in obtaining a sufficient effect of improving the utilization factor thereof. On the other hand, if the amount goes beyond 10% by weight, the β-nickel hydroxide content of the active material may become relatively small to result in the failure to obtain a sufficient discharge capacity.

The amount of additive is preferably in the range of 0.1–5% by weight, as reduced to the amount of yttrium, gadolinium, erbium or ytterbium element, with respect to the amount of the β-nickel hydroxide. If the amount falls below 0.1% by weight, the failure to increase the oxygen overvoltage to an sufficient level may result which leads to the failure to obtain a sufficient discharge capacity. On the other hand, if the amount goes beyond 5% by weight, the β-nickel hydroxide content of the active material becomes relatively small, possibly resulting in the failure to obtain a sufficient discharge capacity.

In the present invention, the valence numbers of nickel atoms in the positive active material are preferably in the range of 2.1–3.4. If they are below 2.1, the sufficient reduction of discharge reserve may not result. On the other hand, if they exceed 3.4, the γ-NiOOH is produced to reduce a bulk density of nickel powder. This may result in the insufficient loading of active material in a substrate, leading to the failure to obtain a sufficient cell or battery capacity.

The positive electrode of the present invention, for use in sealed alkaline storage batteries, is obtained by loading the positive active material of the present invention into an electrically conductive core.

The sealed alkaline storage battery of the present invention includes the aforementioned positive electrode of the present invention, a negative electrode and an alkaline liquid electrolyte. Examples of useful negative electrodes include a zinc electrode, a cadmium electrode and a hydrogen storage alloy electrode.

The method of the present invention for fabrication of a positive electrode for use in sealed alkaline storage batteries includes the steps of mixing the active material of the present invention with a binder to provide a paste containing the active material and loading the paste into a conductive core.

The method of the present invention for preparation of active material includes a step of providing β-nickel hydroxide and at least one additive selected from yttrium, gadolinium, erbium and ytterbium, and oxides, hydroxides, fluorides and chlorides thereof, and a step of subjecting the β-nickel hydroxide and the additive to an oxidation treatment with an oxidizing agent in an aqueous alkaline solution.

In the preparing method of the present invention, the aqueous alkaline solution, for use in the oxidation treatment, preferably contains sodium hydroxide and/or potassium hydroxide. The aqueous alkaline solution is preferably provided in the concentration not exceeding 30% by weight. If the concentration exceeds 30% by weight, the γ-nickel oxyhydroxide may be selectively produced during the oxidation treatment to reduce the loading of resulting active material into the electrode, resulting in the failure to obtain a sufficient discharge capacity.

During the oxidation treatment, the aqueous alkaline solution is preferably maintained at a reaction temperature of 10–50° C. If the reaction temperature is below 10° C., the oxidation reaction may be retarded. On the other hand, if it exceeds 50° C., the reduced discharge capacity may result which is conceivably explained by the following reason: The excessively high reaction rate causes the rapid and selective oxidation of secondary particle surfaces of nickel hydroxide to result in the conversion of β-nickel hydroxide to the γ-nickel oxyhydroxide, via the β-nickel oxyhydroxide. This change in crystal form causes the active material to fall off, leading to a lower loading thereof.

The oxidizing agent used in the oxidation treatment may preferably be of at least one type selected from the group consisting of sodium hypochlorite ($NaClO_4$), sodium peroxodisulfate ($Na_2S_2O_8$), hydrogen peroxide ($H_2O_2$) and potassium peroxodisulfate ($K_2S_2O_8$). By the use of such oxidizing agents, the degree of oxidation reaction between the β-nickel oxyhydroxide and the aforementioned additive can be suitably controlled to produce effective active materials.

DESCRIPTION OF THE PREFERRED EMBODIMENTS

The following embodiments and examples illustrate the practice of the present invention but are not intended to be limiting thereof. Various changes and modifications can be suitably made without departing from the scope of the present invention.

The advantages of the present invention will become apparent from the following Experiments 1 through 6.

Experiment 1

In this Experiment 1, the significanct characteristics of the positive active material and positive electrode, respectively according to the present invention, were investigated using differenct types of additives. Specifically, β-nickel hydroxide (β-Ni(OH)$_2$) together with at least one additive selected from metallic yttrium (Y), gadolinium (Gd), erbium (Er) and ytterbium (Yb), and compounds thereof, were subjected to an oxidation treatment with an oxidizing agent in an aqueous alkaline solution to obtain positive active materials of the present invention, for comparison to conventional positive active materials. The additives used were of reagent grade.

The types of compounds containing yttrium, gadolinium, erbium and ytterbium, as starting materials, were also studied.

The following Preparation Examples 1-1 through 1-22 relate to the present invention. For comparative purposes, Comparative Examples 1-1 through 1-8 are given.

PREPARATION EXAMPLE 1-1

In this Preparation Example, the preparation of active material, for use in sealed alkaline storage batteries, is first described in detail, followed by the descriptions of the nonsintered-nickel electrode using the active material and then the sealed alkaline storage battery using the electrode.

(a) Active Material Preparation

STEP 1: 2.5 liter of an aqueous solution containing nickel sulfate dissolved therein was prepared. A 5 wt. % ammonia solution and a 10 wt. % sodium hydroxide solution, respectively in water, were added simultaneously in a dropwise manner to the aqueous nickel sulfate solution. The mixture was maintained at a pH of 11. An automatically temperature-compensated glass electrode (pH meter) was employed to monitor the pH of the mixture. The mixture was then filtered to separate therefrom a precipitate which was subsequently washed with water and vacuum dried. As a result, β-nickel hydroxide powder was obtained.

STEP 2: 1 liter of an aqueous solution containing 13.2 g of cobalt sulfate ($CoSO_4$) dissolved therein was charged with 100 g of β-nickel hydroxide (β-$Ni(OH)_2$) obtained in step 1. A 1 mole/l aqueous solution of sodium hydroxide (NaOH) was added with agitation to the mixture to adjust its pH. After adjustment to a pH of 11, the reaction was continued under agitation for 1 hour. When the pH of the mixture showed a slight drop, the 1 mole/l aqueous nickel hydroxide was added dropwise as appropriate to maintain the mixture at a pH of 11. The mixture was then filtered to separate therefrom a precipitate which was subsequently washed with water and vacuum dried. As a result, composite particles z-1, i.e., nickel hydroxide particles covered with a cobalt hydroxide ($Co(OH)_2$) surface layer, were obtained. Atomic absorption spectrometry revealed a cobalt content of 5% by weight, with respect to the amount of β-nickel hydroxide.

STEP 3: 100 g of the aforementioned composite particles and 8.2 g of yttrium oxide ($Y_2O_3$), as an additive, were added to 1,000 ml of 10 wt. % aqueous solution of sodium hydroxide maintained at 50° C. The mixture was stirred for 10 minutes. The aqueous sodium hydroxide solution contained 125 ml of 12 wt. % aqueous sodium hypochlorite (NaClO) dissolved therein. The mixture was then filtered to separate a precipitate which was subsequently washed with water and vacuum dried to obtain active material a-1. The powder of active material a-1 was subjected to ferrimetric and ferrometric redox titration to determine a valence number of nickel atoms. The valence number determined was 2.2. Also, the yttrium content of the active material a-1 was analyzed by ICP emission spectrometry which gave the result of 3.0% by weight, with respect to the amount of β-nickel hydroxide.

(b) Nonsintered-nickel Positive Electrode Fabrication 90 parts by weight of the active material a-1 prepared in the manner as described above and 20 parts by weight of 1 wt. % aqueous solution of methyl cellulose, as a binder, were mixed to prepare a paste. The paste was then loaded into a porous conductive core made of nickel-plated foam metal (having a porosity of 95% and an average pore size of 200 μm), followed by drying and pressing into an electrode aa-1, as a positive electrode.

(c) Sealed Alkaline Storage Battery Assembly

A battery A-1, an AA-size sealed alkaline storage battery (having a battery capacity of about 1,000 mAh), was assembled using the aforementioned electrode aa-1 (positive electrode), a conventional pasted cadmium electrode (negative electrode) having a higher electrochemical capacity than the positive electrode, a separator made of polyamide nonwoven fabric, an alkaline electrolyte solution consisting of 30 wt. % aqueous solution of potassium hydroxide, a battery case made of metal, a battery lid made of metal and others.

PREPARATION EXAMPLE 1-2

The procedure of Preparation Example 1-1 was followed, except that 3.0 g of metallic yttrium (Y), instead of 8.2 g of yttrium oxide, was used as an additive, to prepare active material a-2 and assemble a battery A-2. The yttrium content of the active material was determined by ICP emission spectrometry which gave the result of 3.0% by weight with respect to the amount of β-nickel hydroxide.

PREPARATION EXAMPLE 1-3

The procedure of Preparation Example 1-1 was followed, except that 4.7 g of yttrium hydroxide ($Y(OH)_3$), instead of 8.2 g of yttrium oxide, was used as an additive, to prepare active material a-3 and assemble a battery A-3. The yttrium content of the active material was determined by ICP emission spectrometry which gave the result of 3.0% by weight with respect to the amount of β-nickel hydroxide.

PREPARATION EXAMPLE 1-4

The procedure of Preparation Example 1-1 was followed, except that 4.9 g of yttrium fluoride ($YF_3$), instead of 8.2 g of yttrium oxide, was used as an additive, to prepare active material a-4 and assemble a battery A-4. The yttrium content of the active material was determined by ICP emission spectrometry which gave the result of 3.0% by weight, with respect to the amount of β-nickel hydroxide.

PREPARATION EXAMPLE 1-5

The procedure of Preparation Example 1-1 was followed, except that 6.6 g of yttrium chloride ($YCl_3$), instead of 8.2 g of yttrium oxide, was used as an additive, to prepare active material a-5 and assemble a battery A-5. The yttrium content of the active material was determined by ICP emission spectrometry which gave the result of 3.0% by weight, with respect to the amount of β-nickel hydroxide.

PREPARATION EXAMPLE 1-6

The procedure of Preparation Example 1-1 was followed, except that 3.0 g of metallic gadolinium (Gd), instead of 8.2 g of yttrium oxide, was used as an additive, to prepare active material a-6 and assemble a battery A-6. The gadolinium content of the active material was determined by ICP emission spectrometry which gave the result of 3.0% by weight, with respect to the amount of β-nickel hydroxide.

PREPARATION EXAMPLE 1-7

The procedure of Preparation Example 1-1 was followed, except that 7.2 g of gadolinium oxide ($Gd_2O_3$), instead of 8.2 g of yttrium oxide, was used as an additive, to prepare active material a-7 and assemble a battery A-7. The gadolinium content of the active material was determined by ICP emission spectrometry which gave the result of 3.0% by weight, with respect to the amount of β-nickel hydroxide.

PREPARATION EXAMPLE 1-8

The procedure of Preparation Example 1-1 was followed, except that 4.0 g of gadolinium hydroxide $(Gd(OH)_3)$, instead of 8.2 g of yttrium oxide, was used as an additive, to prepare active material a-8 and assemble a battery A-8. The gadolinium content of the active material was determined by ICP emission spectrometry which gave the result of 3.0% by weight, with respect to the amount of β-nickel hydroxide.

PREPARATION EXAMPLE 1-9

The procedure of Preparation Example 1-1 was followed, except that 4.1 g of gadolinium fluoride $(GdF_3)$, instead of 8.2 g of yttrium oxide, was used as an additive, to prepare active material a-9 and assemble a battery A-9. The gadolinium content of the active material was determined by ICP emission spectrometry which gave the result of 3.0% by weight, with respect to the amount of β-nickel hydroxide.

PREPARATION EXAMPLE 1-10

The procedure of Preparation Example 1-1 was followed, except that 5.0 g of gadolinium chloride $(GdCl_3)$, instead of 8.2 g of yttrium oxide, was used as an additive, to prepare active material a-10 and assemble a battery A-10. The gadolinium content of the active material was determined by ICP emission spectrometry which gave the result of 3.0% by weight, with respect to the amount of β-nickel hydroxide.

PREPARATION EXAMPLE 1-11

The procedure of Preparation Example 1-1 was followed, except that 3.0 g of metallic erbium (Er), instead of 8.2 g of yttrium oxide, was used as an additive, to prepare active material a-11 and assemble a battery A-11. The erbium content of the active material was determined by ICP emission spectrometry which gave the result of 3.0% by weight, with respect to the amount of β-nickel hydroxide.

PREPARATION EXAMPLE 1-12

The procedure of Preparation Example 1-1 was followed, except that 7.1 g of erbium oxide $(Er_2O_3)$, instead of 8.2 g of yttrium oxide, was used as an additive, to prepare active material a-12 and assemble a battery A-12. The erbium content of the active material was determined by ICP emission spectrometry which gave the result of 3.0% by weight, with respect to the amount of β-nickel hydroxide.

PREPARATION EXAMPLE 1-13

The procedure of Preparation Example 1-1 was followed, except that 3.9 g of erbium hydroxide $(Er(OH)_3)$, instead of 8.2 g of yttrium oxide, was used as an additive, to prepare active material a-13 and assemble a battery A-13. The erbium content of the active material was determined by ICP emission spectrometry which gave the result of 3.0% by weight, with respect to the amount of β-nickel hydroxide.

PREPARATION EXAMPLE 1-14

The procedure of Preparation Example 1-1 was followed, except that 4.0 g of erbium fluoride $(ErF_3)$, instead of 8.2 g of yttrium oxide, was used as an additive, to prepare active material a-14 and assemble a battery A-14. The erbium content of the active material was determined by ICP emission spectrometry which gave the result of 3.0% by weight, with respect to the amount of β-nickel hydroxide.

PREPARATION EXAMPLE 1-15

The procedure of Preparation Example 1-1 was followed, except that 4.9 g of erbium chloride $(ErCl_3)$, instead of 8.2 g of yttrium oxide, was used as an additive, to prepare active material a-15 and assemble a battery A-15. The erbium content of the active material was determined by ICP emission spectrometry which gave the result of 3.0% by weight, with respect to the amount of β-nickel hydroxide.

PREPARATION EXAMPLE 1-16

The procedure of Preparation Example 1-1 was followed, except that 3.0 g of metallic ytterbium (Yb), instead of 8.2 g of yttrium oxide, was used as an additive, to prepare active material a-16 and assemble a battery A-16. The ytterbium content of the active material was determined by ICP emission spectrometry which gave the result of 3.0% by weight, with respect to the amount of β-nickel hydroxide.

PREPARATION EXAMPLE 1-17

The procedure of Preparation Example 1-1 was followed, except that 7.1 g of ytterbium oxide $(Yb_2O_3)$, instead of 8.2 g of yttrium oxide, was used as an additive, to prepare active material a-17 and assemble a battery A-17. The ytterbium content of the active material was determined by ICP emission spectrometry which gave the result of 3.0% by weight, with respect to the amount of β-nickel hydroxide.

PREPARATION EXAMPLE 1-18

The procedure of Preparation Example 1-1 was followed, except that 3.9 g of ytterbium hydroxide $(Yb(OH)_3)$, instead of 8.2 g of yttrium oxide, was used as an additive, to prepare active material a-18 and assemble a battery A-18. The ytterbium content of the active material was determined by ICP emission spectrometry which gave the result of 3.0% by weight, with respect to the amount of β-nickel hydroxide.

PREPARATION EXAMPLE 1-19

The procedure of Preparation Example 1-1 was followed, except that 4.0 g of ytterbium fluoride $(YbF_3)$, instead of 8.2 g of yttrium oxide, was used as an additive, to prepare active material a-19 and assemble a battery A-19. The ytterbium content of the active material was determined by ICP emission spectrometry which gave the result of 3.0% by weight, with respect to the amount of β-nickel hydroxide.

PREPARATION EXAMPLE 1-20

The procedure of Preparation Example 1-1 was followed, except that 4.8 g of ytterbium chloride $(YbCl_3)$, instead of 8.2 g of yttrium oxide, was used as an additive, to prepare active material a-20 and assemble a battery A-20. The ytterbium content of the active material was determined by ICP emission spectrometry which gave the result of 3.0% by weight, with respect to the amount of β-nickel hydroxide.

PREPARATION EXAMPLE 1-21

The procedure of Preparation Example 1-1 was followed, except that 4.1 g of yttrium oxide $(Y_2O_3)$ and 3.6 g of ytterbium oxide $(Yb_2O_3)$, instead of 8.2 g of yttrium oxide, were used in combination as an additive, to prepare active material a-21 and assemble a battery A-21. The yttrium and ytterbium contents of the active material were determined by ICP emission spectrometry which gave the result of 1.5% by weigh, for each, with respect to the amount of β-nickel hydroxide.

PREPARATION EXAMPLE 1-22

The procedure of Preparation Example 1-1 was followed, except that 2.7 g of yttrium oxide ($Y_2O_3$), 2.4 g of ytterbium oxide ($Yb_2O_3$) and 2.4 g of erbium oxide ($Er_2O_3$), instead of 8.2 g of yttrium oxide, were used in combination as an additive, to prepare active material a-22 and assemble a battery A-22. The yttrium, ytterbium and erbium contents of the active material were determined by ICP emission spectrometry which gave the result of 1.0% by weight, for each, with respect to the amount of β-nickel hydroxide.

Comparative Example 1-1

7.9 g of cobalt hydroxide ($Co(OH)_2$) was added to 100 g of powdered nickel hydroxide ($Ni(OH)_2$) to obtain powder-form active material x-1. The procedure of Preparation Example 1-1 was followed, except that the active material x-1 such obtained was used, to obtain a comparative battery X-1.

Comparative Example 1-2

6.4 g of cobalt monoxide (CoO) was added to 100 g of powdered nickel hydroxide ($Ni(OH)_2$) to obtain powder-form active material x-2. The procedure of Preparation Example 1-1 was followed, except that the active material x-2 such obtained was used, to obtain an electrode xx-2 and a comparative battery X-2.

Comparative Example 1-3

A potassium peroxodisulfate ($K_2S_2O_8$) solution and a potassium hydroxide (KOH) solution were mixed with 100 g of powdered nickel hydroxide ($Ni(OH)_2$) to obtain 2.2-valent nickel oxyhydroxide. The nickel oxyhydroxide powder thus obtained was added with stirring to an aqueous solution of cobalt sulfate ($CoSO_4$). Liquid sodium hydroxide was further added dropwise to the mixture to obtain active material x-3 comprised of nickel oxyhydroxide powder carrying a cobalt hydroxide surface layer. The procedure of Preparation Example 1-1 was followed, except that the active material x-3 such obtained was used, to obtain a comparative battery X-3.

Comparative Example 1-4

6.4 g of cobalt monoxide (CoO) was mixed with 100 g of nickel hydroxide ($Ni(OH)_2$) powder. Subsequently, potassium peroxodisulfate ($K_2S_2O_8$) was added to the mixture to oxidize cobalt monoxide, present at a surface of nickel hydroxide powder, to cobalt oxyhydroxide. As a result, active material x-4 was obtained. The procedure of Preparation Example 1-1 was followed, except that the active material x-4 such obtained was used, to obtain a comparative battery X-4.

Comparative Example 1-5

100 g of nickel hydroxide ($Ni(OH)_2$) powder, 6.4 g of cobalt hydroxide ($Co(OH)_2$) and 8.2 g of yttrium oxide ($Y_2O_3$) were mixed to obtain active material x-5. The procedure of Preparation Example 1-1 was followed, except that the active material x-5 such obtained was used, to obtain a comparative battery X-5.

Comparative Example 1-6

100 g of powder z-1 obtained in the aforementioned Preparation Example 1-1 was mixed with 8.2 g of yttrium oxide ($Y_2O_3$) to obtain active material x-6. The procedure of Preparation Example 1-1 was followed, except that the active material x-6 such obtained was used, to obtain a comparative battery X-6.

Comparative Example 1-7

100 ml of 12 wt. % aqueous solution of sodium hypochlorite (NaClO) was dissolved in 1000 ml of 10 wt. % aqueous solution of sodium hydroxide, maintained at 50° C. 100 g of the composite particles obtained in Preparation Example 1-1 was added to and stirred in the aqueous mixture for 10 minutes. Filtration, rinsing and drying followed to obtain 100 g of powder to which 8.2 g of yttrium oxide ($Y_2O_3$) was subsequently added for mixture to obtain powder-form active material x-7. This powder was subjected to ferrimetric and ferrometric redox titration to determine a valence number of nickel atoms. The valence number determined was 2.2. The procedure of Preparation Example 1-1 was followed, except that the active material x-7 such obtained was used, to obtain a comparative battery X-7.

Comparative Example 1-8

The procedure of Preparation Example 1-1 was followed, except that 14.9 g of yttrium oxalate ($Y_2(C_2O_4)_3$) was used instead of yttrium oxide, to obtain powder-form active material x-8 and a comparative battery X-8. The yttrium content of the active material was determined by ICP emission spectrometry which gave the result of 3.0% by weight, with respect to the amount of β-nickel hydroxide.

The batteries A-1 through A-22, as well as the comparative batteries X-1 though X-8, were tested for initial discharge capacity and cycle characteristics. The following test condition was used: Each battery was charged at the 0.5 C rate at 25° C. for 2.5 hours and then discharged at the 0.5 C rate at 25° C. to 1.0 V. This charge-discharge cycle was repeated 10 times to determine a 10th-cycle discharge capacity Q-1 (mAh) of each battery.

On the same condition, the charge-discharge cycle was further repeated 490 times to determine a 500th-cycle discharge capacity Q-2 (mAh) of each battery. For each battery, a ratio P (%) of the discharge capacity Q-2 to the initial discharge capacity Q-1 was also calculated. The ratio P is an indicator of the cycle characteristic. The larger the P value, the higher the discharge capacity even after cycling.

The results are shown in Table 1. The discharge capacities Q-1's are represented in Table 1 by relative values when the discharge capacity Q-1 of battery A-1 was taken as a value of 100. The batteries' 10th-cycle discharge capacities Q-1's and cycle characteristics P's are hereinafter given by relative values when the discharge capacity Q-1 of battery A-1 was taken as a value of 100.

TABLE 1

| Designation of Battery | Type of Additive | Designation of Active Material | Initial Discharge Capacity Q-1 | Cycle Characteristic P |
|---|---|---|---|---|
| A1 | $Y_2O_3$ | a1 | 100 | 97 |
| A2 | Y | a2 | 100 | 95 |
| A3 | $Y(OH)_3$ | a3 | 100 | 96 |

TABLE 1-continued

| Designation of Battery | Type of Additive | Designation of Active Material | Initial Discharge Capacity Q-1 | Cycle Characteristic P |
|---|---|---|---|---|
| A4 | $YF_3$ | a4 | 100 | 95 |
| A5 | $YCl_3$ | a5 | 100 | 94 |
| A6 | Gd | a6 | 100 | 95 |
| A7 | $Gd_2O_3$ | a7 | 100 | 96 |
| A8 | $Gd(OH)_3$ | a8 | 100 | 95 |
| A9 | $GdF_3$ | a9 | 100 | 94 |
| A10 | $GdCl_3$ | a10 | 99 | 95 |
| A11 | Er | a11 | 100 | 96 |
| A12 | $Er_2O_3$ | a12 | 100 | 96 |
| A13 | $Er(OH)_3$ | a13 | 100 | 95 |
| A14 | $ErF_3$ | a14 | 100 | 95 |
| A15 | $ErCl_3$ | a15 | 100 | 94 |
| A16 | Yb | a16 | 100 | 96 |
| A17 | $Yb_2O_3$ | a17 | 100 | 96 |
| A18 | $Yb(OH)_3$ | a18 | 100 | 95 |
| A19 | $YbF_3$ | a19 | 100 | 94 |
| A20 | $YbCl_3$ | a20 | 100 | 95 |
| A21 | $Y_2O_3$, $Yb_2O_3$ | a21 | 100 | 96 |
| A22 | $Y_2O_3$, $Yb_2O_3$, $Er_2O_3$ | a22 | 100 | 96 |
| X1 | — | x1 | 90 | 80 |
| X2 | — | x2 | 90 | 80 |
| X3 | — | x3 | 91 | 81 |
| X4 | — | x4 | 92 | 81 |
| X5 | $Y_2O_3$ | x5 | 93 | 82 |
| X6 | $Y_2O_3$ | x6 | 93 | 83 |
| X7 | $Y_2O_3$ | x7 | 94 | 84 |
| X8 | $Y_2(C_2O_4)_3$ | x8 | 93 | 84 |

As can be appreciated from the results shown in Table 1, the batteries of the present invention, A-1 through A-22, exhibit the increased initial and 500th-cycle discharge capacities, compared to the comparative batteries X-1 through X-8. This demonstrates that the addition of any of metallic yttrium, gadolinium, erbium and ytterbium, and oxides, hydroxides, fluorides and chlorides thereof, during the oxidation treatment, results in obtaining positive active materials which, when incorporated into batteries, serve to increase the discharge capacities thereof both initially and over a long period of time.

Experiment 2

In this Experiment 2, the amount and type of the cobalt compound used to cover the β-nickel hydroxide, prior to being sujected to the oxidation treatment, were studied.

As a preliminary experiment, cobalt hydroxide ($Co(OH)_2$) and a 25 wt. % aqueous solution of sodium hydroxide (NaOH) were mixed in a weight ratio of 1:10, heated at 90° C. for 5 hours, washed with water and dried at 60° C. to prepare a sodium-containing cobalt compound. The sodium content of this sodium-containing cobalt compound was determined by atomic absorption spectrometry which gave the result of 1% by weight.

The following Preparation Examples 2-1 through 2-3 relate to the present invention.

PREPARATION EXAMPLE 2-1

The powder comprised of composite particles obtained in the above Preparation Example 1-1 was mixed with a 25 wt. % aqueous solution of sodium hydroxide (NaOH) in a weight ratio of 1:10, heated at 90° C. for 5 hours, washed with water and dried at 65° C. to prepare powder-form active material b-1 comprised of composite particles consisting of nickel hydroxide particles covered with a sodium-containing cobalt compound surface layer. The sodium content of the sodium-containing cobalt compound deposited to form the surface layer was estimated to be 1 weight %, in view of the above-performed preliminary experiment. The procedure of Preparation Example 1-1 was followed, except that the active material b-1 such obtained was used, to obtain a battery B-1.

PREPARATION EXAMPLE 2-2

The procedure of Preparation Example 1-1 was followed, except that 6.4 g of cobalt monoxide (CoO), instead of 5 g of cobalt hydroxide, was used to cover the nickel hydroxide particle surfaces by a mechanical charging technique, to prepare active material b-2 and assemble a battery B-2.

PREPARATION EXAMPLE 2-3

The procedure of Preparation Example 1-1 was followed, except that the amount of cobalt sulfate was altered from 13.2 g to 1.32 g, 2.65 g, 26.5 g and 31.8 g, to prepare active materials b-3 through b-6 and assemble batteries B-3 through B-6.

The amount of cobalt compound deposited to cover β-nickel hydroxide particle surfaces was determined by atomic absorption spectrometry which gave the results of 0.5% by weight, 1% by weight, 10% by weight and 12% by weight, respectively, as reduced to the amount of cobalt atoms, with respect to the amount of β-nickel hydroxide.

A charge-discharge test was conducted in the same manner as in the above Preparation Example 1-1, using the batteries B-1 through B-6 thus obtained, as well as the battery A-1 obtained in the preceding Experiment 1. The results are shown in Table 2.

TABLE 2

| Designation of Battery | Designation of Active Material | Type of Co Compound | Coverage (wt. %) | Initial Discharge Capacity Q-1 | Cycle Characteristic P |
|---|---|---|---|---|---|
| B1 | b1 | Na-containing Co Compound | 5 | 110 | 102 |
| B2 | b2 | Cobalt Monoxide | 5 | 100 | 95 |
| A1 | a1 | Cobalt Hydroxide | 5 | 100 | 97 |
| B3 | b3 | Cobalt Hydroxide | 0.5 | 97 | 89 |
| B4 | b4 | Cobalt Hydroxide | 1 | 99 | 95 |
| B5 | b5 | Cobalt Hydroxide | 10 | 100 | 96 |
| B6 | b6 | Cobalt Hydroxide | 12 | 97 | 89 |

As can be seen from the results shown in Table 2, the use of at least one type selected from cobalt monoxide, cobalt hydroxide and a sodium-containing cobalt compound, as the cobalt compound deposited to form a surface layer, results in obtaining positive active materials which, when incorporated into batteries, serve to increase the discharge capacities thereof both initially and over a long period of time. In the case where the sodium-containing cobalt compound was used, the battery exhibited a particularly high discharge capacity both initially and after cycling. This is considered due to the increased oxygen overvoltage when the sodium-containing cobalt compound was used than when cobalt hydroxide or cobalt monoxide was used.

It has been confirmed that the similar results are obtained when such cobalt compounds are deposited to cover β-nickel hydroxide particle surfaces, as well as when they are mixed with β-nickel hydroxide.

As can also be appreciated, the amount of cobalt hydroxide, as reduced to the amount of cobalt atoms, is preferably controlled to fall within the range of 1–10 weight %, with respect to the amount of β-nickel hydroxide. From investigations regarding the effective amounts of cobalt monoxide and the sodium-containing cobalt compound, it has been found that, analogous to the case of cobalt hydroxide, they are preferably controlled in amount to fall within the range of 1–10 weight %, as reduced to the amount of cobalt atoms, with respect to the amount of β-nickel hydroxide.

Experiment 3

In this Experiment 3, the desired amount of additive to be introduced during the oxidation treatment of β-nickel hydroxide was investigated.

The procedure of Preparation Example 1-1 was followed, except that the amount of yttrium oxide ($Y_2O_3$) was altered from 8.2 g to 0.027 g, 0.27 g, 14 g and 16 g, to prepare active materials c-1 through c-4 and assemble batteries C-1 through C-4. A charge-discharge test was conducted in the same manner as in the above Preparation Example 1-1. The test results obtained for the batteries C-1 through C-4, as well as for the battery A-1 assembled in the Preparation Example 1, are shown in Table 3.

TABLE 3

| Designation of Battery | Amount of $Y_2O_3$ (wt. %) | Initial Discharge Capacity Q-1 | Cycle Characteristic P |
|---|---|---|---|
| C1 | 0.01 | 98 | 89 |
| C2 | 0.1 | 99 | 95 |
| A1 | 3.0 | 100 | 97 |
| C3 | 5.0 | 99 | 95 |
| C4 | 6.0 | 98 | 89 |

These results demonstrate that the amount of the yttrium oxide additive to be introduced during the oxidative treatment, is desirably controlled to fall within the range of 0.1–5.0 weight %, as reduced to the amount of yttrium element, with respect to the amount of β-nickel hydroxide. Also, the desired amounts were investigated for other additives which included metallic elements such as yttrium, gadolinium, erbium and ytterbium, and compounds thereof other than yttrium oxide. It has been confirmed that such additives are desirably controlled in amount to fall within the range of 0.1–5.0 weight %, as reduced to the amount of metallic element contained therein.

Experiment 4

In this Experiment 4, the optimum Ni valence number, during the chemical oxidation treatment of β-nickel hydroxide in the presence of the additive, was investigated.

The procedure of Preparation Example 1-1 was followed, except that the amount of the oxidizing agent was altered from 125 ml to 0 ml, 75 ml, 225 ml, 275 ml, 525 ml, 725 ml and 775 ml (7 variations), to prepare active materials d-1 through d-7. The Ni valence numbers thereof were determined by ferrimetric and ferrometric redox titration which gave the respective results of 2.0, 2.1, 2.4, 2.5, 3.0, 3.4 and 3.5. If the Ni valence number is 2.5 or larger, the battery becomes negative-limited due to the insufficient charging of the negative electrode, and fails to obtain a sufficient discharge capacity.

The active materials d-1 through d-3 were used individually to assemble batteries D-1 through D-3. 92.4 g of cobalt hydroxide-covered β-nickel hydroxide powder (z-1) was mixed with 7.6 g of yttrium oxide ($Y_2O_3$) powder to prepare a powder z-2. The active materials d-4 through d-7 were respectively mixed with this powder z-2 in the weight ratios of 40:60, 20:80, 14:86 and 13:87 (4 variations), so that an average Ni valence number of particles in each powder mixture was adjusted to a value of 2.2. Batteries D-4 through D-7 were assembled using such powder mixtures. A charge-discharge test was conducted in the same manner as in the above Preparation Example 1-1, using those batteries D-1 through D-7 obtained in this Experiment and the battery A-1 obtained in the above Experiment 1. The results are shown in Table 4.

TABLE 4

| Designation of Battery | Designation of Active Material (Ni Valence Number) | Valence Number of Ni in Electrode | Initial Discharge Capacity Q-1 | Cycle Characteristic P |
|---|---|---|---|---|
| D1 | d1(2.0) | 2.0 | 96 | 87 |
| D2 | d2(2.1) | 2.1 | 100 | 95 |
| A1 | a1(2.2) | 2.2 | 100 | 97 |
| D3 | d3(2.4) | 2.4 | 99 | 95 |
| D4 | d4(2.5) z2(2.0) | 2.2 | 100 | 98 |
| D5 | d5(3.0) z2(2.0) | 2.2 | 100 | 96 |
| D6 | d6(3.4) z2(2.0) | 2.2 | 99 | 95 |
| D7 | d7(3.5) z2(2.0) | 2.2 | 97 | 89 |

As can be seen from Table 4, the batteries D-2 through D-6 with active materials having Ni valence number in the range of 2.1–3.4 exhibited high discharge capacities both initially and after 500 cycles. The Ni valence number of below 2.1 is considered leading to an excess discharge reserve which results in the reduction of discharge capacity. On the other hand, if the Ni valence number exceeds 3.4, a proportion of γ-nickel oxyhydroxide in active material increases to result in the reduced loading of the active material, leading to the failure to obtain a sufficient discharge capacity.

Experiment 5

In this Experiment 5, investigation was made regarding the types and the concentrations of the alkaline solution used in the oxidation treatment wherein the β-nickel oxyhydroxide was chemically oxidized in the presence of an yttrium compound (hydroxide) additive.

The procedure of Preparation Example 1-1 was followed, except that the concentration of the aqueous sodium hydroxide solution was altered from 10 wt. % to 5 wt. %, 30 wt. % and 40 wt. % (3 variations), to prepare active materials e-1 through e-3 and assemble batteries E-1 through E-3. Likewise, an aqueous solution of potassium hydroxide was used at concentrations of 5 wt. %, 30 wt. % and 40 wt. % (3 variations), instead of using the 10 wt. % aqueous solution of sodium hydroxide, to prepare active materials e-4 through e-6 and assemble batteries E-4 through E-6. Furthermore, the 10 wt. % aqueous solution of sodium hydroxide was replaced by a mixture of 10 wt. % aqueous solution of sodium hydroxide and 10 wt. % aqueous solution of potassium hydroxide to prepare active material e-7 and assemble a battery E-7. A charge-discharge test was conducted using the batteries obtained in the manner as stated above.

The results are given in Table 5. The results obtained in Experiment 1 for the active material a-1 and battery A-1 are also shown.

TABLE 5

| Designation of Battery | Designation of Active Material | Amount of NaOH (wt. %) | Amount of KOH (wt. %) | Initial Discharge Capacity Q-1 | Cycle Characteristic P |
|---|---|---|---|---|---|
| E1 | e1 | 5 | 0 | 97 | 95 |
| A1 | a1 | 10 | 0 | 100 | 97 |
| E2 | e2 | 30 | 0 | 100 | 96 |
| E3 | e3 | 40 | 0 | 97 | 90 |
| E4 | e4 | 0 | 5 | 100 | 95 |
| E5 | e5 | 0 | 30 | 100 | 96 |
| E6 | e6 | 0 | 40 | 97 | 90 |
| E7 | e7 | 10 | 10 | 100 | 96 |

As can be seen from the results shown in Table 5, it is desired that at least one of sodium and potassium hydroxide solutions is added during the oxidation treatment in the concentration of not exceeding 30 wt. %. The concentration of alkaline solution, if exceeding 30 wt. %, leads to the reduction in discharge capacity of batteries. Presumably, this is because a major proportion of β-nickel hydroxide is converted to γ-nickel oxyhydroxide, rather than to β-nickel oxyhydroxide, to result in the reduced loading of active material in a positive electrode.

In addition, the alkaline solution concentration was varied in conjunction with the use of various additives, other than yttrium hydroxide, which included metallic yttrium, gadolinium, erbium and ytterbium, and their compounds, to investigate a suitable concentration range of the alkaline solution. The trends substantially consistent with the preceding experiment using yttrium hydroxide were observed with the use of those additives, i.e., the desired and optimal concentration ranges of the alkaline solution were confirmed to lie between 5 wt. % and 30 wt. % and between 10 wt. % and 30 wt. %, respectively.

Experiment 6

In this Experiment, investigation was made regarding the reaction temperature used in the oxidation treatment wherein the β-nickel oxyhydroxide was chemically oxidized in the presence of yttrium oxide additive.

The procedure of Preparation Example 1-1 was followed, except that the reaction temperature was changed from 50° C. to 0° C., 10° C., 30° C. and 60° C. (4 variations), to prepare active materials k-1 through k-4 and assemble batteries K-1 through K-4. A charge-discharge test was conducted using the batteries obtained in the manner as stated above, as well as the battery A-1 obtained in Experiment 1. The results are given in Table 6.

TABLE 6

| Designation of Battery | Designation of Active Material | Reaction Temperature (° C.) | Initial Discharge Capacity Q-1 | Cycle Characteristic P |
|---|---|---|---|---|
| K1 | k1 | 0 | 97 | 88 |
| K2 | k2 | 10 | 99 | 94 |
| K3 | k3 | 30 | 100 | 95 |
| A1 | a1 | 50 | 100 | 97 |
| K4 | k4 | 60 | 97 | 88 |

As can be appreciated from the results shown in Table 6, the reaction temperature during the oxidation treatment is desired to be maintained within the 10° C.–50° C. range. The following presumably explains why the reaction temperature outside this range leads to the reduction in discharge capacity of resulting batteries: If the reaction temperature falls below 10° C., a marked reduction in rate of the oxidation reaction of nickel hydroxide occurs to retard the oxidation of Ni. On the other hand, if the reaction temperature exceeds 50° C., the excessively high reaction rate causes the rapid and selective oxidation of secondary particle surfaces of nickel hydroxide to result in the conversion of β-nickel hydroxide to the γ-nickel oxyhydroxide, via the β-nickel oxyhydroxide. Such change in crystal form causes the active material to fall off.

For additives, other than yttrium hydroxides, including metallic yttrium, gadolinium, erbium and ytterbium, and compounds thereof, a suitable reaction temperature was investigated. It has been confirmed from this investigation that the reaction temperature during the oxidation treatment is desired to be maintained within the 10° C.–50° C. range.

In this Experiment, nickel hydroxide was used as starting particles. It has been confirmed, however, that the similar results are obtained with the use of solid solutions of nickel hydroxide and at least one element selected from zinc (Zn), cadmium (Cd), cobalt (Cd), magnesium (Mg), manganese (Mn), calcium (Ca), aluminum (Al), copper (Cu), bismuth (Bi), yttrium (Y), ytterbium (Yb), erbium (Er) and gadolinium (Gd).

In the above examples and experiment, the illustrated sealed alkaline storage battery used a cadmium electrode for its negative electrode. However, the similar results are obtained with the use of other negative electrodes including a zinc electrode and a hydrogen storage alloy electrode.

The present invention has a significant industrial value for its provisions of positive active material which, when used in the manufacture of sealed alkaline storage batteries, imparts thereto a high discharge capacity both initially and over a long period of time, a positive electrode using the positive active material and a sealed alkaline storage battery utilizing the positive electrode.

What is claimed is:

1. A positive active material for a sealed alkaline storage battery, said positive active material containing nickel with a valence number in a range from 2.1 to 3.4, and being obtainable by subjecting β-nickel hydroxide, together with at least one additive selected from yttrium, gadolinium, erbium and ytterbium, and oxides, hydroxides, fluorides and chlorides thereof, to an oxidation treatment with at least one oxidizing agent selected from the group consisting of sodium hypochlorite ($NaClO_4$), sodium peroxodisulfate ($Na_2S_2O_8$), and potassium peroxodisulfate ($K_2S_2O_8$), in an aqueous alkaline solution.

2. The positive active material of claim 1, wherein at least one material selected from cobalt hydroxide, cobalt monoxide and a sodium-containing cobalt compound is mixed with said β-nickel hydroxide, or is deposited onto said β-nickel hydroxide so as to cover said β-nickel hydroxide, and wherein said material contains cobalt atoms in an amount of 1 to 10% by weight with respect to the weight of said β-nickel hydroxide.

3. The positive active material of claim 1, wherein said at least one additive contains an amount of 0.1 to 5% by weight of yttrium, gadolinium, erbium or ytterbium element, with respect to the weight of said β-nickel hydroxide.

4. A positive electrode for a sealed alkaline storage battery, comprising a conductive core and said positive active material of claim 1 loaded in said conductive core.

5. A sealed alkaline storage battery including said positive electrode of claim 4, a negative electrode and an alkaline electrolyte.

6. The sealed alkaline storage battery of claim 5, wherein said negative electrode comprises at least one electrode selected among a zinc electrode, a cadmium electrode and a hydrogen storage alloy electrode.

7. A method of fabricating a positive electrode for a sealed alkaline storage battery, including the steps of mixing said positive active material of claim 1 with a binder to prepare an active material paste, and loading said active material paste in a conductive core.

8. A method of preparing a positive active material for a sealed alkaline storage battery, including the steps of:

provicing β-nickel hydroxide and at least one additive selected from yttrium, gadolinium, erbium and ytterbium, and oxides, hydroxides, fluorides and chlorides thereof; and subjecting said β-nickel hydroxide and said at least one additive to an oxidation treatment with an oxidizing agent in an aqueous alkaline solution, so as to prepare said positive active material containing nickel with a valence number in a range from 2.1 to 3.4, wherein said oxidizing agent is at least one agent selected from the group consisting of sodium hypochlorite ($NaClO_4$), sodium peroxodisulfate ($Na_2S_2O_8$), and potassium peroxodisulfate ($K_2S_2O_8$).

9. The method of claim 8, further including another step, prior to said oxidation treatment, of mixing or covering said β-nickel hydroxide with at least one cobalt compound selected from cobalt hydroxide, cobalt monoxide and a sodium-containing cobalt compound, wherein said cobalt compound contains cobalt atoms in an amount of 1 to 10% by weight with respect to the weight of said β-nickel hydroxide.

10. The method of claim 8, wherein said additive contains an amount of 0.1 to 5% by weight of yttrium, gadolinium, erbium or ytterbium element, with respect to the weight of said β-nickel hydroxide.

11. The method of claim 8, wherein said aqueous alkaline solution contains at least one of sodium hydroxide and potassium hydroxide in a concentration not exceeding 30% by weight.

12. The method of claim 8, further comprising maintaining said aqueous alkaline solution within a temperature range from 10° C. to 50° C.

13. The positive active material of claim 1, wherein said positive active material further contains an amount of at least one metallic elemental component included in said at least one additive.

14. The positive active material of claim 13, wherein said amount is in a range from 0.1 to 5.0 weight % in terms of said metallic elemental component relative to the weight of said β-nickel hydroxide.

15. The positive active material of claim 1, wherein said positive active material has a crystal structure as results from subjecting said β-nickel hydroxide together with said at least one additive to said oxidation treatment.

16. The positive active material of claim 15, wherein said crystal structure incorporates metallic ions of said at least one additive diffused into said crystal structure.

17. The positive active material of claim 1, which, when incorporated into an electrode of a sealed alkaline storage battery, provides a ratio of discharge capacity in a $500^{th}$ discharge cycle relative to discharge capacity in a $10^{th}$ discharge cycle of at least 94%.

18. The positive active material of claim 1, wherein said valence number of said nickel is at least 2.4.

* * * * *

UNITED STATES PATENT AND TRADEMARK OFFICE
CERTIFICATE OF CORRECTION

PATENT NO. : 6,576,368 B1
DATED : June 10, 2003
INVENTOR(S) : Ogasawara et al.

It is certified that error appears in the above-identified patent and that said Letters Patent is hereby corrected as shown below:

Title page,
Item [75], Inventors, should read as follows:
-- Takeshi Ogasawara, Kobe, Japan;
   Nobuyuki Higashiyama, Ikeda, Japan;
   Mutsumi Yano, Hirakata, Japan;
   Mamoru Kimoto, Hirakata, Japan;
   Yasuhiko Itoh, Yawata, Japan;
   Koji Nishio, Kyoto, Japan --.

Column 1,
Line 31, after "has", replace "required. that" by -- required that --;
Line 33, after "substrate", replace "with.nickel" by -- with nickel --.

Signed and Sealed this

Twenty-first Day of October, 2003

JAMES E. ROGAN
*Director of the United States Patent and Trademark Office*